UNITED STATES PATENT OFFICE.

JOHN JOHNSON, OF BROOKLYN, NEW YORK.

COMPOSITION ADAPTED FOR STEAM-PACKING.

SPECIFICATION forming part of Letters Patent No. 451,693, dated May 5, 1891.

Application filed June 14, 1890. Serial No. 355,454. (Specimens.)

*To all whom it may concern:*

Be it known that I, JOHN JOHNSON, of Brooklyn, in the county of Kings and State of New York, have invented an Improved Composition Adapted for Steam-Packing and other Uses, of which the following is a specification.

My invention relates to a compound that can be vulcanized at about the temperature of hard rubber, and is adapted to use as a packing for steam pipes and joints and for the surfaces of steam and water valves, and it may also be used to advantage for the cells of galvanic and other batteries, the same being very strong and durable and well adapted to resisting the action of acids.

I make use of the following materials and in about the proportion specified—that is to say, ten pounds of crude rubber, ten pounds of bone-black, five pounds of gutta-percha, four pounds of sulphur, and two and one-half pounds of ozocerite. These materials are to be intimately mixed together by machinery, such as made use of in rubber factories or otherwise, and rolled into sheets or made up into whatever form, shape, or article may be desired, after which the composition is subjected to a heat about equal to that made use of in the manufacture of hard rubber, so as to cure or vulcanize the materials and cause them to unite into a solid, durable, and strong substance or article. I find that when bone-black is used in a larger proportion than that named the strength of the material is usually lessened. I therefore do not limit myself to the precise proportions specified, and I find that ozocerite or material having similar properties, such as mineral wax, introduced in the compound, aids in filling the pores of the bone-black and making a more perfect union between the same and the rubber and gutta-percha, and such bone-black is well adapted to resisting the action of acids, and also it aids in stiffening the material manufactured from the composition.

I am aware that india-rubber, lamp-black, and mica have been used for steam-packing, and in my patent, No. 209,270, rubber, sulphur, bone-black, and gutta-percha are set forth. The bone-black, being an animal substance, possesses different properties from lamp-black, and in my present invention the addition of ozocerite or similar material gives to the compound additional solidity and prevents the action of acids on the same.

I claim as my invention—

The composition of rubber, bone-black, gutta-percha, sulphur, and ozocerite or equivalent material, substantially in the proportion and as set forth.

Signed by me this 11th day of June, 1890.

JOHN JOHNSON.

Witnesses:
GEO. T. PINCKNEY,
WILLIAM G. MOTT.